United States Patent
Bruno et al.

(10) Patent No.: US 6,942,452 B2
(45) Date of Patent: Sep. 13, 2005

(54) GROMMETED BYPASS DUCT PENETRATION

(75) Inventors: Vittorio Bruno, Mississauga (CA); Goli Hadi, Mississauga (CA); Bryan Olver, Nobleton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 118 days.

(21) Appl. No.: 10/320,411

(22) Filed: Dec. 17, 2002

(65) Prior Publication Data

US 2004/0111829 A1 Jun. 17, 2004

(51) Int. Cl.⁷ .............................. F01D 11/00
(52) U.S. Cl. .................. 415/135; 415/136; 415/144; 415/214.1; 60/799; 60/705; 277/606; 277/616; 277/630; 277/641; 248/56; 16/2.2; 174/65 G; 174/152 G; 174/153 G
(58) Field of Search ................ 415/144–145, 415/135–138, 214.1; 60/799, 785; 277/606, 616, 630, 641; 285/215, 216, 921; 248/56; 16/2.1, 2.2; 174/65 G, 152 G, 153 G, 65 SS

(56) References Cited

U.S. PATENT DOCUMENTS

| | | | |
|---|---|---|---|
| 1,697,814 A | * | 1/1929 | Forbes .................... 16/2.1 |
| 2,039,009 A | | 4/1936 | Laprindri et al. |
| 2,421,456 A | * | 6/1947 | Judisch .................... 174/153 G |
| 2,517,717 A | * | 8/1950 | Rose .................... 285/192 |
| 2,586,528 A | * | 2/1952 | Gerson .................... 16/2.1 |
| 2,762,117 A | * | 9/1956 | Houck .................... 29/521 |
| 2,762,118 A | * | 9/1956 | Shaw et al. .................... 29/521 |
| 2,933,983 A | | 4/1960 | Riger et al. |
| 3,109,662 A | * | 11/1963 | Bergstrom .................... 277/606 |
| 3,572,733 A | | 3/1971 | Howald et al. |
| 3,819,118 A | * | 6/1974 | Brock et al. .................... 239/276 |
| 4,183,207 A | | 1/1980 | Libertini |
| 4,282,627 A | * | 8/1981 | Downing .................... 174/153 G |
| 4,300,773 A | * | 11/1981 | Jelinek .................... 277/630 |
| 4,331,338 A | | 5/1982 | Caldwell et al. |
| 4,640,479 A | * | 2/1987 | Shely et al. .................... 248/56 |
| 4,706,999 A | * | 11/1987 | Hynes .................... 285/196 |
| 5,071,143 A | | 12/1991 | Byerly et al. |
| 5,104,286 A | | 4/1992 | Donlan |
| 5,609,467 A | | 3/1997 | Lenhart et al. |
| 5,639,993 A | * | 6/1997 | Ideno et al. .................... 174/153 G |
| 5,692,858 A | * | 12/1997 | Vaughan .................... 405/43 |
| 5,836,048 A | | 11/1998 | Rossman et al. |
| 6,119,305 A | | 9/2000 | Loveall et al. |
| 6,185,885 B1 | | 2/2001 | Thaler |

FOREIGN PATENT DOCUMENTS

| | | |
|---|---|---|
| GB | 554 167 | 6/1943 |
| GB | 783 970 | 10/1957 |
| GB | 2 057 084 | 3/1981 |

* cited by examiner

Primary Examiner—Christopher Verdier
(74) Attorney, Agent, or Firm—Ogilvy Renault LLP

(57) ABSTRACT

A bypass duct sealing grommet, for sealing between an opening in a gas turbine engine bypass duct wall and the external surface of a projection extending through the opening, where the grommet has an annular body with a central aperture having an interior periphery adapted to sealingly engage the external surface of the projection. A first flange and second flanges define an external slot about an exterior periphery of the body adapted to receive and seal the bypass duct wall between the flanges.

16 Claims, 8 Drawing Sheets

GROMMETED BYPASS DUCT PENETRATION

TECHNICAL FIELD

The invention relates to a thin-walled duct penetration sealing grommet, particularly useful for sealing between an opening in a gas turbine engine bypass duct wall and the external surface of a projection extending through the opening to simplify manufacture by eliminating complex joint configurations, while accommodating pressure differential, and relative thermal expansion and contraction.

BACKGROUND OF THE ART

The bypass duct of a turbofan gas turbine engine contains a pressurized flow of air between the outer duct wall and the engine core. At several locations along the length and about the circumference of the annular bypass duct, penetrations are necessary for conveying fuel, oil, control cables or compressed air bleed from the compressor to an aircraft cabin, as well as many control and monitoring penetrations for instrumentation, inspection and maintenance.

In the prior art, penetrations through the bypass duct are generally accomplished by shrouding the conduits or cables in a transverse sheet metal projection that may be contoured for improved aerodynamic properties. The intersection between the transverse sheet metal projection and the sheet metal walls of the bypass duct are generally manufactured with a flange that is riveted or faulted to the relatively thin sheet metal bypass duct walls. Such connections however must also accommodate the difference in pressure between the pressurized flow of air through the bypass duct and the ambient air surrounding the exterior of the engine. Further, the engine core and the associated inner bypass duct wall are exposed to significant heat and thermal expansion and contraction relative to the less exposed outer bypass wall. As a result, relative thermal expansion and contraction is also accommodated by the connection between the projection and the outer bypass wall or the inner bypass wall depending on the particular arrangement.

As a result of the pressure differential and need to accommodate relative thermal expansion and contraction, the sealing and mechanical connection between projections through the bypass wall and the relatively thin bypass duct walls is a relatively complex arrangement requiring clearance for expansion and contraction, resilient seals and quite often involves riveting a structural support or containment flange to the relatively thin bypass duct walls surrounding the opening for the penetration.

It is an object of the invention to provide a means to seal between the opening and the gas turbine engine bypass duct wall and the external surface of a projection extending through the opening which accommodates relative thermal expansion and contraction and pressure differential in a simple low cost manner.

Further objects of the invention will be apparent from review of the disclosure, drawings and description of the invention below.

DISCLOSURE OF THE INVENTION

The invention provides a bypass duct sealing grommet, for sealing between an opening in a gas turbine engine bypass duct wall and the external surface of a projection extending through the opening. Conventionally, the intersection between the projection and the sheet metal bypass duct requires accurate fitting and welding, but cannot then accommodate thermal expansion and contraction. The grommet enables an oversized opening for accommodating relative thermal motion and simplifies manufacture. The grommet has an annular body with a central aperture adapted to seal against the external surface of the projection and two flanges defining an external slot about an exterior periphery of the body to contain and seal the bypass duct wall between the flanges.

DESCRIPTION OF THE DRAWINGS

In order that the invention may be readily understood, one embodiment of the invention is illustrated by way of example in the accompanying drawings.

Further details of the invention and its advantages will be apparent from the detailed description included below.

DETAILED DESCRIPTION OF PREFERRED EMBODIMENTS

Figure 1:
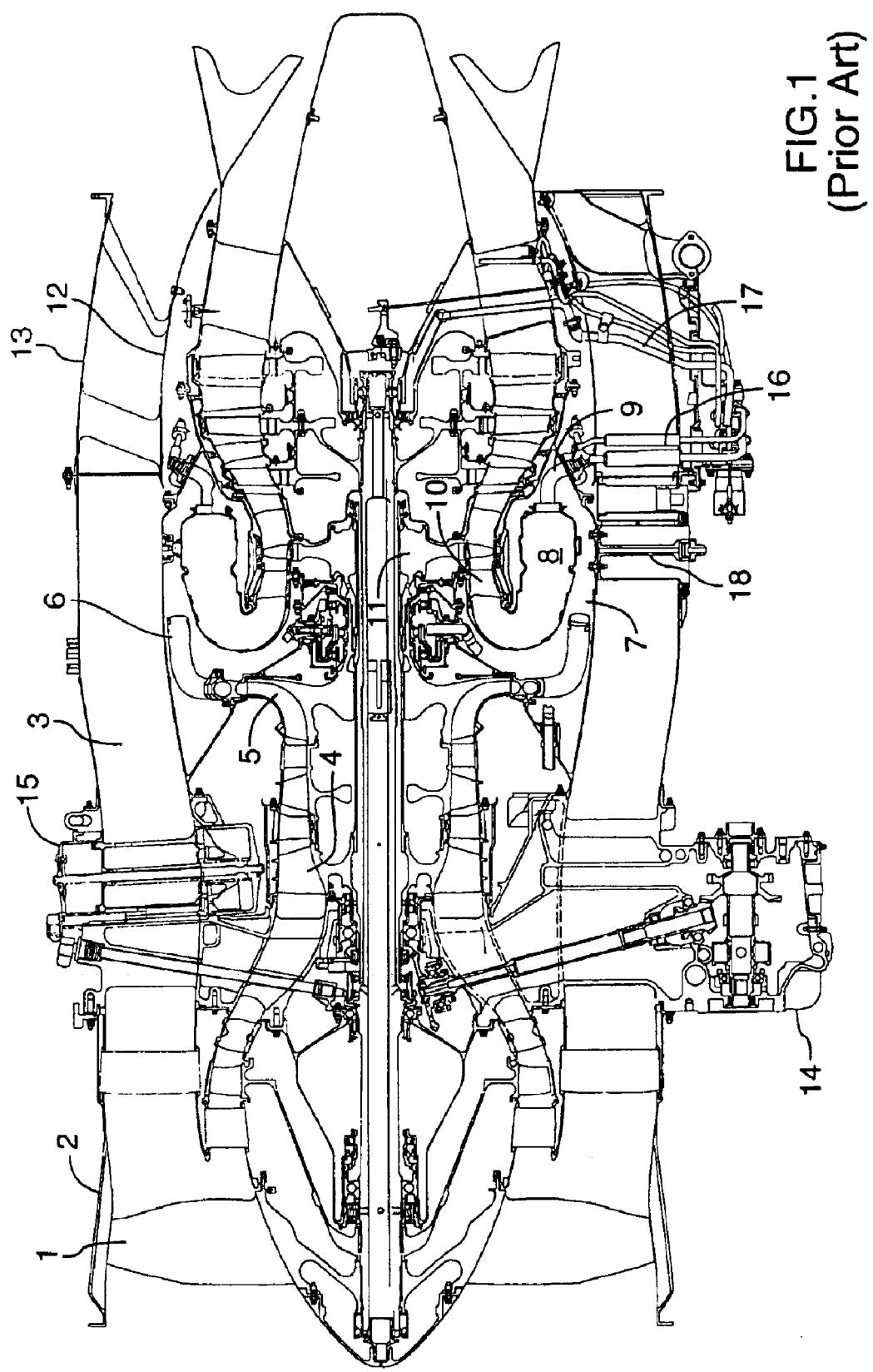
FIG. 1 is an axial cross-sectional view through a typical turbofan gas turbine engine showing the general arrangement of internal components and in particular the numerous penetrations through the outer annular bypass duct.

FIG. 1 shows an axial cross-section through a turbofan gas turbine engine. It will be understood however that the invention is also applicable to any type of engine with a thin-walled air duct with a penetration(s) requiring sealing. Air intake into the engine passes over fan blades 1 in a fan case 2 and is then split into an outer annular flow through the bypass duct 3 and an inner flow through the low-pressure axial compressor 4 and high-pressure centrifugal compressor 5. Compressed air exits the compressor 5 through a diffuser 6 and is contained within a plenum 7 that surrounds the combustor 8. Fuel is supplied to the combustor 8 through fuel tubes 9 which is mixed with air from the plenum 7 when sprayed through nozzles into the combustor 8 as a fuel air mixture that is ignited. A portion of the compressed air within the plenum 7 is admitted into the combustor 8 through orifices in the side walls to create a cooling air curtain along the combustor walls or is used for cooling to eventually mix with the hot gases from the combustor and pass over the nozzle guide vane 10 and turbines 11 before exiting the tail of the engine as exhaust.

FIG. 1 illustrates numerous projections and penetrations through the bypass duct 3. Penetrations project through relatively thin sheet metal inner bypass wall 12 and sheet metal or fiber composite outer bypass wall 13. While the accessory gear box 14 has a relatively rigid metal casing that extends through the bypass duct 3, smaller penetrations or projections are also required such as the compressed air bleed valve 15, penetrations for fuel supply lines 16, lubricating oil supply line 17 and igniter 18.

Figure 2:
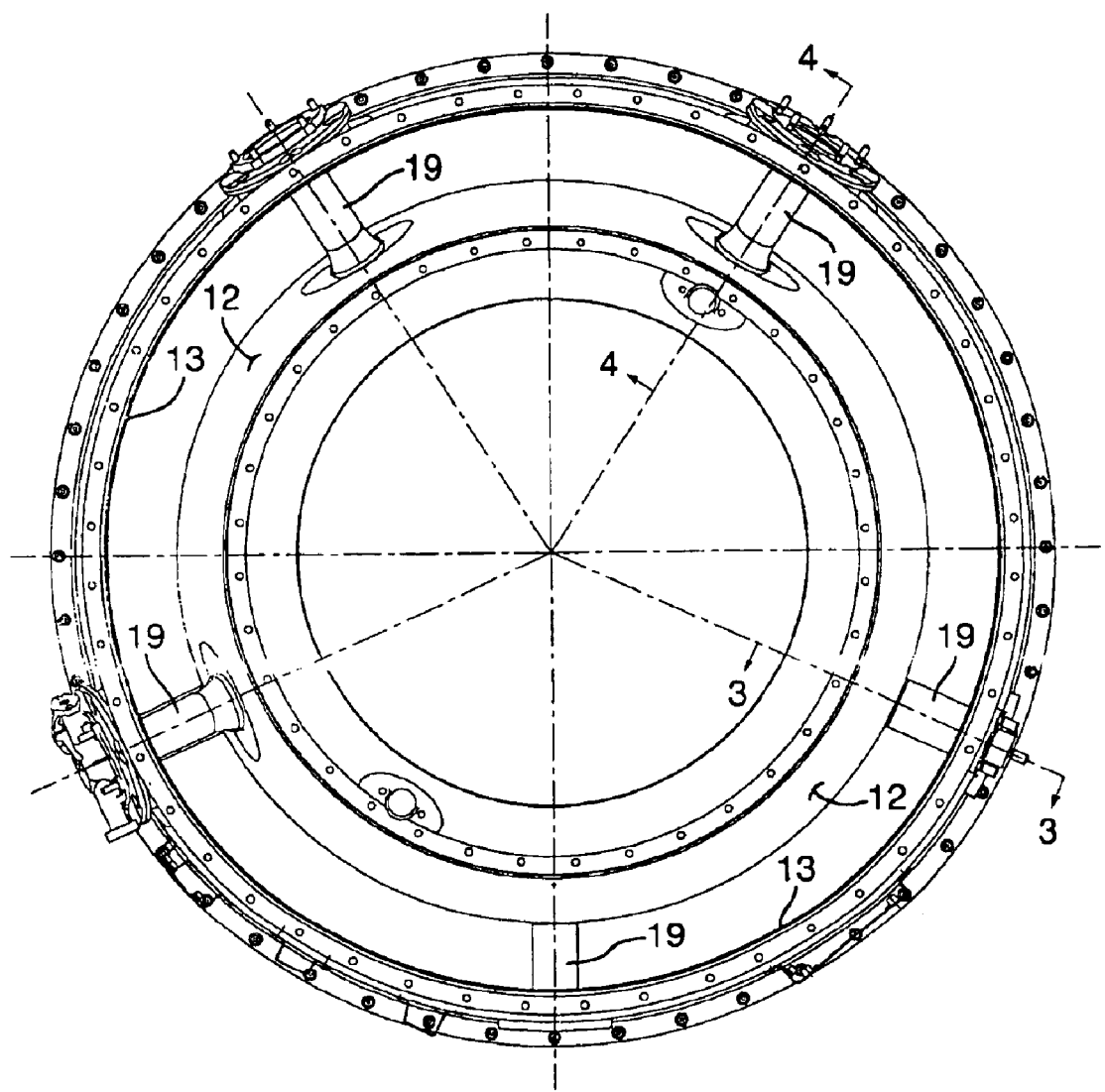
FIG. 2 is a radial cross-sectional view through the bypass duct of FIG. 1.

FIG. 2 is a radial cross-sectional view on line 2—2 of FIG. 1 showing five penetrating projections 19 extending between the inner bypass wall 12 and outer bypass wall 13 for internally housing various conduits and other services extending between the exterior surface of the engine and the central engine core.

Figure 3:
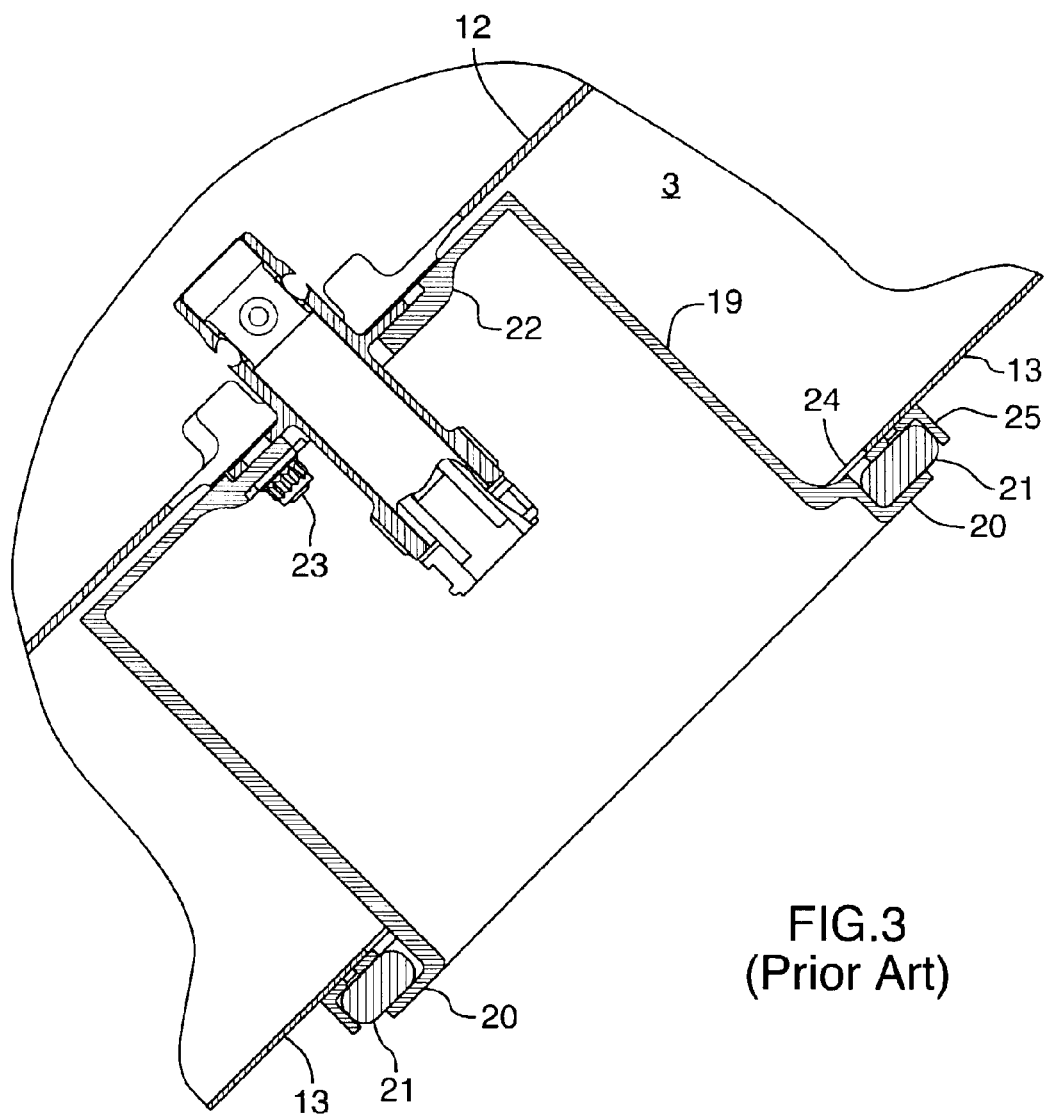
FIG. 3 is a detailed axial cross-sectional view through a prior art penetration through the bypass duct shown along the line 3—3 of FIG. 2.

FIG. 3 shows an example axial cross-sectional detail view through a conventional prior art projection 19 having an outer flange 20 mounted to the outer bypass wall 13 with a resilient gasket 21. The projection 19 includes an internal end wall 22 fixed with bolts 23 to the inner bypass wall 12. It will be appreciated that the bypass duct 3 contains an annular flow of fast moving pressurized air which is sealed from the ambient external air with the gasket 21. Further the relative positions of the inner bypass wall 12 and outer bypass wall 13 vary due to relative thermal expansion and contraction, as well as flexural deflection due to air pressure differential between the bypass duct 3 and ambient external air. In the prior art therefore, the gasket 21 accommodates radial movements and seals the duct 3. The outer bypass wall 13 includes an oversized opening 24 in the thin wall 13 which is reinforced and surrounded by an angle flange 25 riveted to the outer bypass duct wall 13. The angle flange 25 retains the gasket 21 and structurally reinforces the bypass duct wall 13 which is weakened as a result of the opening 24. The opening 24 is oversized in order to accommodate an assembly tolerance in manufacturing and also to accommodate relative movement due to pressure differential, and thermal expansion and contraction between the projection 19 and the outer bypass duct wall 13.

Figure 4:
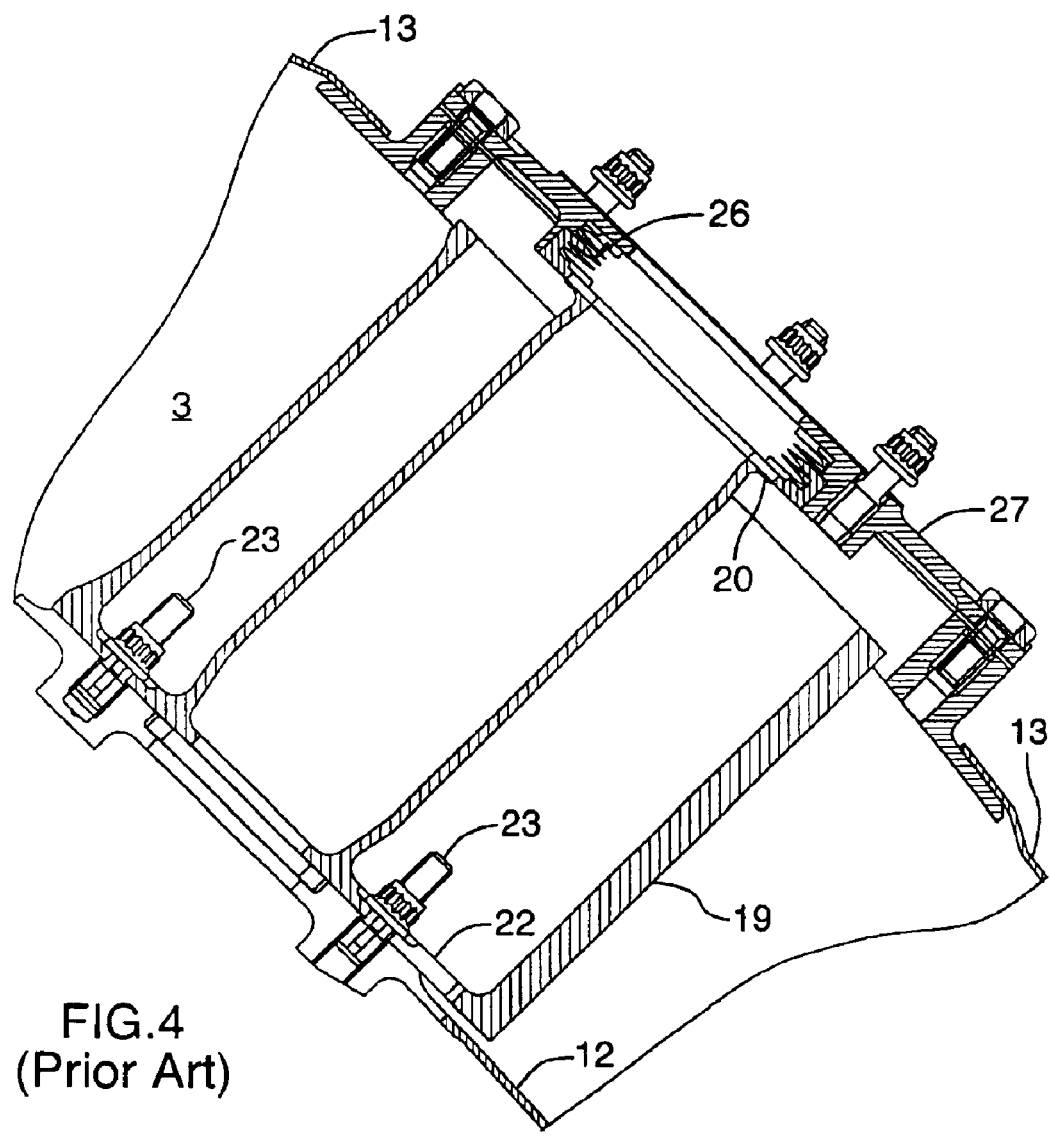
FIG. 4 is an axial cross-sectional view along the line 4—4 of FIG. 2 showing another example of the prior art penetration through the bypass duct wall.

Another example of prior art projection 19 is shown in FIG. 4 which has an end wall 22 secured with bolts 23 to a receiving flange in the inner bypass duct 12. To accommodate relative expansion and contraction between the inner bypass wall 12 and outer bypass wall 13, bellows 26 extend between a flange 20 of the projection 19 and a mounting plate 27 that is bolted to a supporting plates and riveted to the relatively thin outer bypass duct wall 13.

As is apparent from the details of FIGS. 3 and 4 and explanation above, the need to accommodate relative thermal expansion and contraction between the inner bypass duct wall 12 and outer bypass duct wall 13, and to accommodate the pressure differential between the bypass duct 3 and outer ambient air, has resulted in relatively complex structures in the prior art that require accurate fitting, gaskets, bellows and numerous fasteners, rivets and reinforcing flanges.

Figure 5:
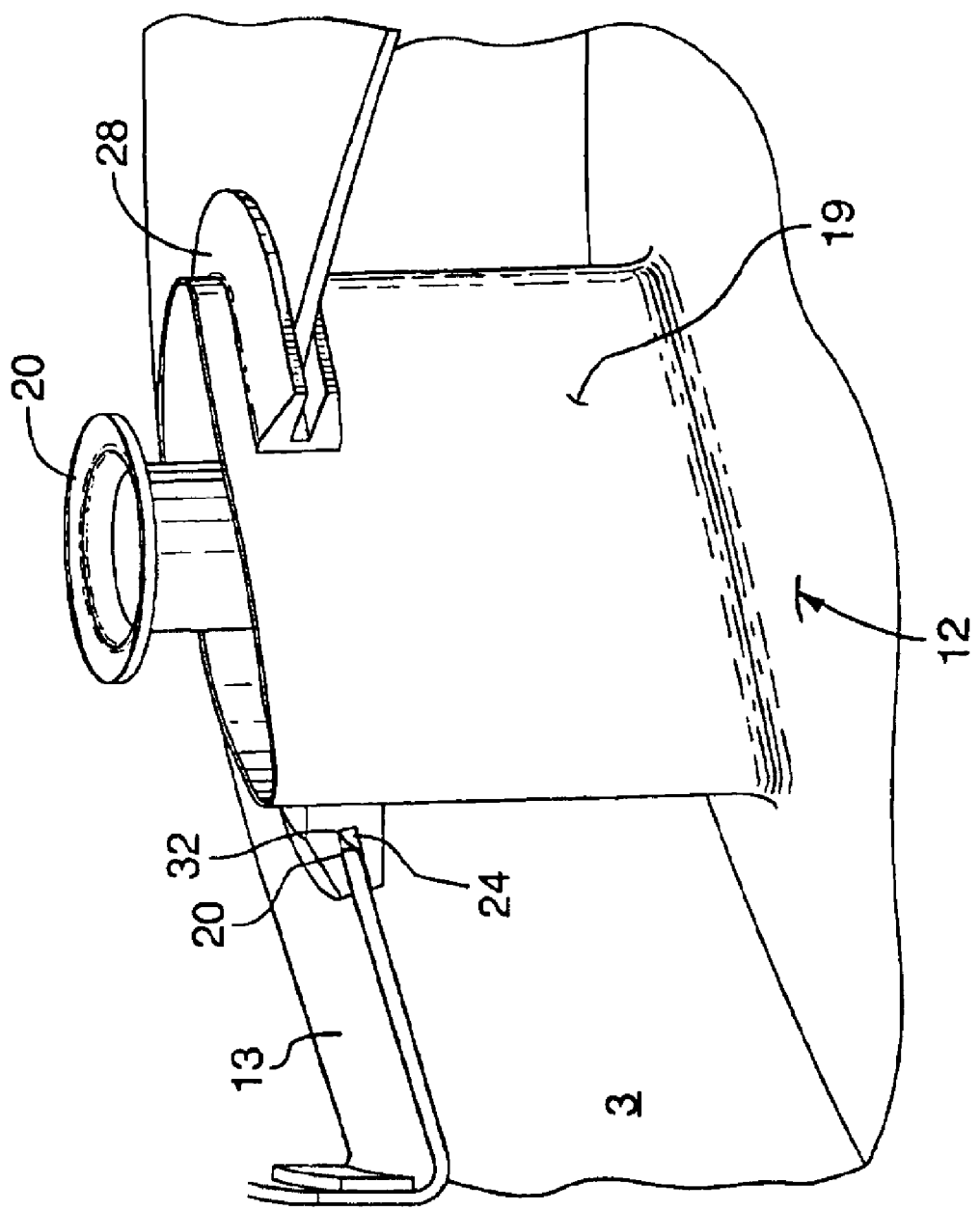
FIG. 5 is a partially cut away perspective view of a penetration through the bypass duct wall with a connecting grommet in accordance with the invention.
Figure 6:
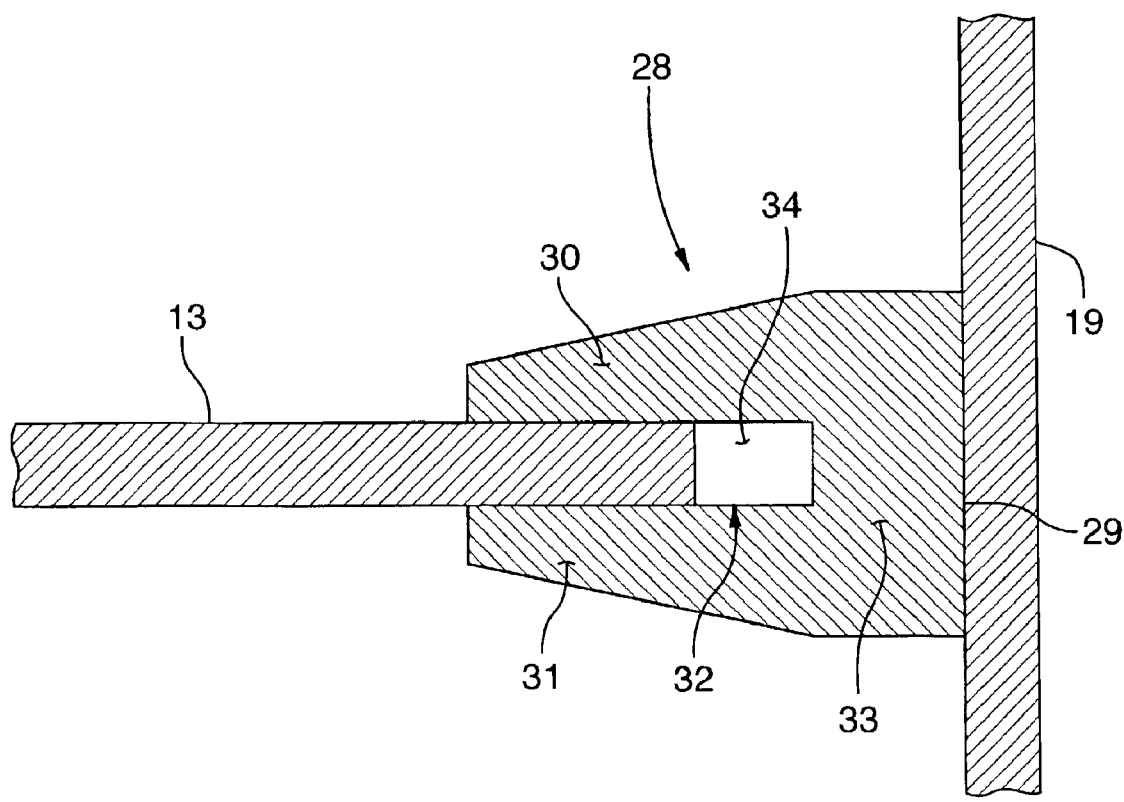
FIG. 6 is a detailed cross-sectional view through a sealing grommet and adjoining sheet metal walls of the bypass duct and projecting penetration showing the symmetrical trapezoidal cross-sectional profile of the grommet when the bypass wall and a wall of the projection are in a perpendicular orientation.

FIG. 5 is a partially cut away perspective view of a bypass duct sealing grommet 28 that provides a simple low cost means to seal between an opening 24 in the gas turbine engine outer bypass duct wall 13 and the external surface of the projection 19 which extends through the opening 24. FIG. 6 shows a detailed sectional view through the sealing grommet 28 which comprises an annular body with a central aperture having an interior peripheral surface 29 that is adapted to seal against the external surface of the projection 19.

As shown in FIG. 6, a first flange 30 and a second flange 31 define an external slot 32 which extends completely about the exterior periphery of the grommet annular body and is adapted to receive and seal the relatively thin bypass duct wall 13 between the flanges 30 and 31. For simplicity in FIGS. 6, 7 and 8 the bypass duct wall 13 is shown as a planar member however it will be appreciated from viewing FIGS. 1 and 2 that the bypass duct wall 13 actually has a radial curvature and an axial curvature which requires that the grommet 28 has the capacity to deform while maintaining the ability to seal and resist the forces caused by pressure differential on opposing sides of the bypass duct wall 13. The grommet 28 must adapt to changes in the orientation of the wall 13 relative to the projection 19 due to the complex curvature of the wall 13 while permitting a degree of relative thermal expansion and contraction and further permitting a degree of manufacturing tolerance in fitting and sealing between the wall 13 and projection 19.

Figure 7:
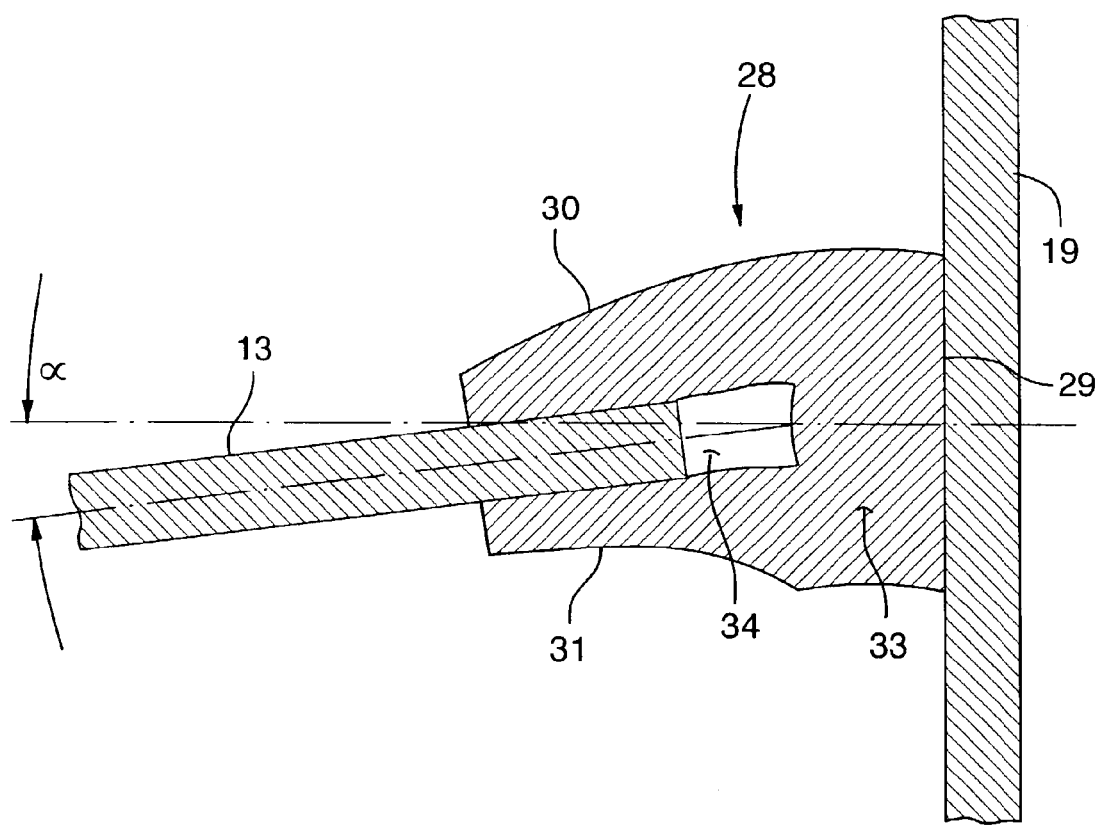
FIG. 7 shows the deformations of the grommet to accommodate an acute angular orientation.
Figure 8:
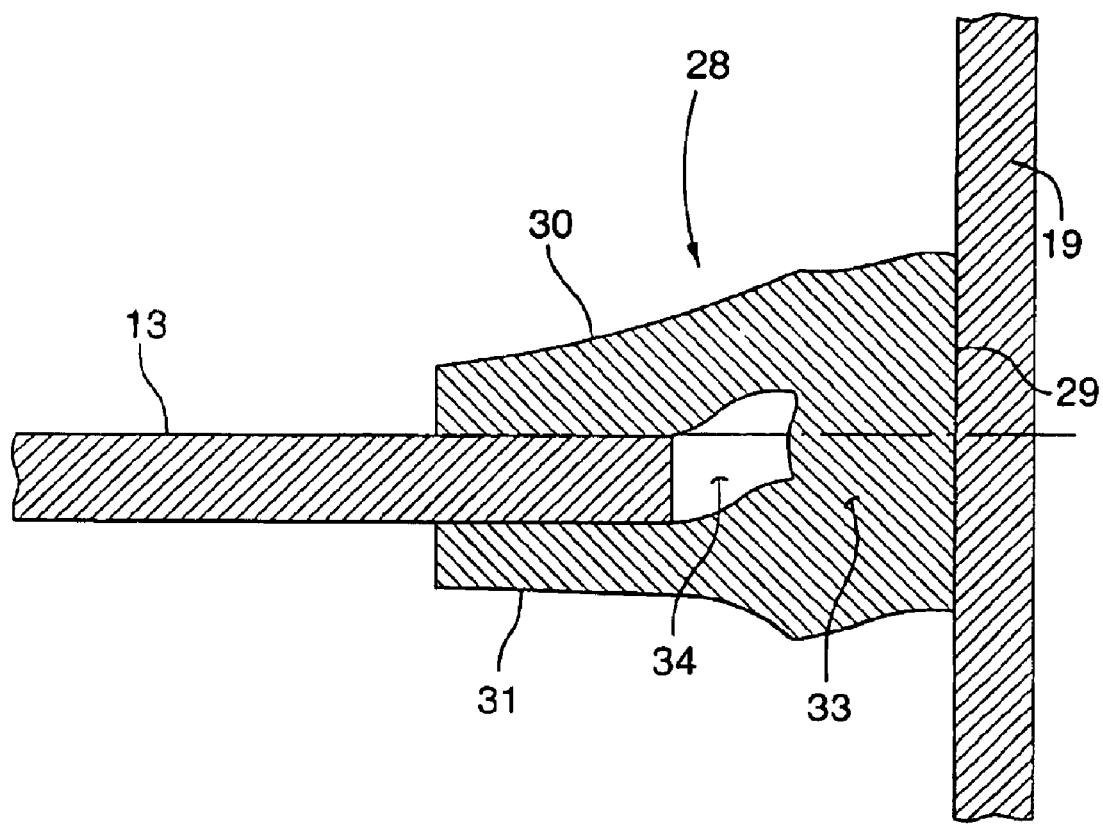
FIG. 8 shows the deformation of the grommet when relative radial motion is encountered between the bypass wall and a wall of the projection as a result of internal pressure or thermal expansion for example.

FIG. 7 shows the manner in which the grommet 28 can be deformed to accommodate an angular orientation indicated by angle "α" whereas FIG. 8 illustrates distortion of the grommet 28 to accommodate radial motion of the bypass duct wall 13 relative to the projection 19 which may be caused by pressure differential or expansion and contraction for example.

In order to ensure that installation of the grommet 28 is not inadvertently reversed, preferably the annular body of the grommet 28 has a uniform or consistent cross-sectional profile symmetric about the slot 32. As a result, during installation the grommet 28 cannot be installed upside down since the preferred cross-sectional profile is symmetric about the slot 32. As will be appreciated by those skilled in the art, the grommet 28 may be molded of silicon in an injection molding process or may be extruded as a silicon strip to create an elongate sealing strip of uniform or consistent cross-sectional profile. The elongate sealing strip of which the grommet 28 is formed, is produced by extrusion through a die opening which is known to those skilled in the art. As a result the cross-section does not vary along the length of the sealing strip or the grommet 28 when installed. During installation, a first end of the elongate sealing strip and a mating second end of the strip abut at a joint which may be secured with adhesives or heat resistant silicon caulking if necessary.

As shown in FIGS. 6, 7 and 8, preferably, the uniform, consistent molded or extruded cross-sectional profile of the grommet annular body 28 is trapezoidal with a relatively thick collar 33 about the periphery of the projection 19 connecting the first and second flanges 30 and 31. The flanges 30 and 31 have a tapered profile which together with the collar 33 provides a variation in resistance to distortion or bending between the relatively flexible outer tip of the flanges 30 and 31 and the stiffer abutting interior peripheral surface 29 which seals against the projection 19. As seen in FIGS. 7 and 8, the trapezoidal profile and use of the collar 33 increases the tendency of the grommet 28 to jam and interfere with relative movement between the outer bypass duct wall 13 and the projection 19. Jamming or distortion creates a resilient or biasing force between the interior peripheral surface 29 and the surface of the projection 19 without the need for embedded springs in the grommet 28. As a result, the seal created by the distorted grommet 28 maintains the pressure differential between opposite surfaces of the outer bypass duct wall 13 while distortion of the grommet 28 permits a degree of relative movement to accommodate thermal expansion and contraction as well as to accommodate variation in the curvature of the outer bypass duct wall 13 and its angular orientation relative to the projection 19.

As in the prior art, the opening 24 which permits the passage of the projection 19 through the outer bypass wall 13 is oversized in order to permit manufacturing and assembly tolerance and to accommodate relative thermal expansion or contraction or distortion as a result of pressure differential.

With reference to FIGS. 5, 6, 7 and 8, the collar 33, flanges 30 and 31 and opening 24 in the bypass duct wall 13 define an annular clearance gap 34 therebetween. The clearance gap 34, as seen in FIG. 6, permits use of an oversized hole 24 with an acceptable assembly and manufacturing tolerance and ability to accommodate relative movement between the bypass duct wall 13 and the projection 19.

As seen in FIGS. 7 and 8 however the clearance gap 34 also permits resilient distortion of the slot 32 and adjacent flanges 30 and 31 to improve the capacity of the grommet 28 to accommodate movement and orientation of the outer bypass duct 13 relative to the projection 19. Therefore, comparing the relatively complex arrangements required by the prior art as illustrated in FIG. 3, in particular compared to the use of the bypass duct sealing grommet 28 as illustrated in FIG. 5, significant savings in assembly cost and simplicity of manufacture are achieved.

Although the above description relates to a specific preferred embodiment as presently contemplated by the inventors, it will be understood that the invention in its broad aspect includes mechanical and functional equivalents of the elements described herein.

We claim:

1. In a gas turbine engine, having: a bypass duct wall having an opening therethrough; and a projection extending through the opening, the projection having an external surface, the improvement comprising:
    a bypass duct sealing grommet, for sealing between the opening and the external surface of the projection extending through the opening, the grommet comprising:
    an annular body having: a central aperture with an interior periphery adapted to sealingly engage the external surface of the projection; a first flange and a second flange defining an external slot about an exterior periphery of the body adapted to receive and seal the bypass duct wall between the flanges.

2. A bypass duct sealing grommet according to claim 1 wherein: the bypass duct wall has a radial curvature and an axial curvature; the projection has an axis; and the annular body has a cross-sectional profile symmetric about the axis of the projection.

3. A bypass duct sealing grommet according to claim 1 wherein the projection has an axis, and the annular body has a cross-sectional profile symmetric about the external slot, and symmetric about the axis of the projection.

4. A bypass duct sealing grommet according to claim 3 wherein the cross-sectional profile of the annular body is trapezoidal.

5. A bypass duct sealing grommet according to claim 1 wherein the body includes a collar connecting the first and second flanges.

6. A bypass duct sealing grommet according to claim 4 wherein the flanges have a tapered profile.

7. A bypass duct sealing grommet according to claim 5 wherein the collar, flanges and opening in the bypass duct wall define an annular clearance gap therebetween.

8. A bypass sealing grommet according to claim 1 wherein the projection has an axis, and the annular body comprises an elongate sealing strip of cross-sectional profile symmetric about the axis of the projection, said elongate sealing strip having a first end and a mating second end abutting at a joint.

9. A gas turbine engine, comprising:
    a bypass duct wall having an opening therethrough;
    a projection extending through the opening, the projection having an external surface;
    a bypass duct sealing grommet comprising an annular body having: a central aperture with an interior periphery adapted to sealingly engage the external surface of the projection; a first flange and a second flange defining an external slot about an exterior periphery of the body adapted to receive and seal the bypass duct wall between the flanges.

10. A gas turbine engine according to claim 9 wherein: the bypass duct wall has a radial curvature; the projection has an axis; and an axial curvature; and the annular body has a cross-sectional profile symmetric about the axis of the projection.

11. A gas turbine engine according to claim 9 wherein the projection has an axis; and the annular body has a cross-sectional profile symmetric about the external slot, and symmetric about the axis of the projection.

12. A gas turbine engine according to claim 11 wherein the cross-sectional profile of the annular body is trapezoidal.

13. A gas turbine engine according to claim 9 wherein the body includes a collar connecting the first and second flanges.

14. A gas turbine engine according to claim 12 wherein the flanges have a tapered profile.

15. A gas turbine engine according to claim 13 wherein the collar, flanges and opening in the bypass duct wall define an annular clearance gap therebetween.

16. A gas turbine engine according to claim 9 wherein the projection has an axis, and the annular body comprises an elongate sealing strip of cross-sectional profile symmetric about the axis of the projection, said elongate sealing strip having a first end and a mating second end abutting at joint.

* * * * *